US 8,816,656 B2

(12) United States Patent
Couleur et al.

(10) Patent No.: US 8,816,656 B2
(45) Date of Patent: Aug. 26, 2014

(54) ELECTRONIC DEVICE FOR SWITCHED DC-DC CONVERSION HAVING HIGH-EFFICIENCY AT HIGH LOAD AND LOW LOAD AND METHOD FOR OPERATING THE SAME

(75) Inventors: Michael Couleur, Munich (DE); Neil Gibson, Freising (DE); Christophe Vaucourt, Munich (DE)

(73) Assignee: Texas Instruments Deutschland GmbH, Freising (DE)

( * ) Notice: Subject to any disclaimer, the term of this patent is extended or adjusted under 35 U.S.C. 154(b) by 452 days.

(21) Appl. No.: 13/163,008

(22) Filed: Jun. 17, 2011

(65) Prior Publication Data
US 2011/0309807 A1 Dec. 22, 2011

(30) Foreign Application Priority Data
Jun. 21, 2010 (DE) .................. 10 2010 024 482

(51) Int. Cl.
*G05F 1/59* (2006.01)
*H02M 3/158* (2006.01)
(52) U.S. Cl.
CPC .................. *H02M 3/1584* (2013.01)
USPC .................. 323/272; 323/283; 323/284

(58) Field of Classification Search
USPC .................. 323/272, 282, 283, 284
See application file for complete search history.

(56) References Cited

U.S. PATENT DOCUMENTS

| 7,315,153 | B2 * | 1/2008 | Tazawa et al. ............... 323/272 |
| 7,638,991 | B1 * | 12/2009 | Kobayashi ............... 323/272 |
| 2009/0168475 | A1 | 7/2009 | Hirosawa |
| 2011/0309807 | A1 * | 12/2011 | Couleur et al. ............... 323/272 |

FOREIGN PATENT DOCUMENTS

JP  11098824  4/1999

OTHER PUBLICATIONS

DE Search Report dated Mar. 30, 2011.

* cited by examiner

*Primary Examiner* — Jeffrey Sterrett
(74) *Attorney, Agent, or Firm* — William B. Kempler; Frederick J. Telecky, Jr.

(57) ABSTRACT

An electronic device for switched DC-DC conversion of an input voltage level into an output voltage level, comprising a first power switch and a second power switch, being connected in parallel and having a different gate width, and a driving stage that is configured to selectively drive the first power switch and/or second power switch depending on a load current output.

14 Claims, 3 Drawing Sheets

ELECTRONIC DEVICE FOR SWITCHED DC-DC CONVERSION HAVING HIGH-EFFICIENCY AT HIGH LOAD AND LOW LOAD AND METHOD FOR OPERATING THE SAME

CROSS-REFERENCE TO RELATED APPLICATIONS

This patent application claims priority from German Patent Application No. 10 2010 024 482.1, filed Jun. 21, 2010, which is incorporated herein by reference in its entirety.

FIELD OF THE INVENTION

This invention relates to an electronic device for a switched DC-DC conversion and further relates to a method for operating the same.

BACKGROUND OF THE INVENTION

Integrated switched DC-DC converters (e.g. a buck-, boost- or buck/boost-converter) mainly show two types of power losses. One type of power loss is due to charging and discharging the control gate, i.e. the gate capacitance of the power switches, e.g. power MOSFETs. The control gate typically receives an alternating control voltage that varies between the primary voltage supply level (also referred to as an input voltage or VIN) and ground. Depending on the specific type of converter and its architecture, the control gate may also receive a higher voltage. The alternating voltage levels at the gate capacitance CG cause an average DC current in the gate driving stage, flowing from the primary voltage supply VIN to ground. The power consumption POWC may be roughly approximated as:

$$POWC = CG \cdot f \cdot VON^2 \quad (1)$$

The power consumption POWC is proportional to the switching frequency f, the gate capacitance CG and the square of the voltage level VON for turning the power switch from a high to a low level.

The second type of power losses is due to the ON-resistance of the power switches. This kind of power loss is resistive and also referred to as RDSON loss. The first order approximation of the ON-resistance RDSON is:

$$RDSON = \left(\mu \cdot COX \cdot \frac{W}{L}(Vgs - Vt) - Vds\right)^{-1} \quad (2)$$

Wherein COX is the gate oxide capacitance per unit control gate area, $\mu$ is the mobility of the charge carriers and W and L are the respective width and length of the control gate.

From the above equations, it becomes clear that by increasing the dimensions of the power switch, which means by increasing its width W, the ON-resistance RDSON may be lowered. However, the capacitive losses will increase, since the power consumption POWC (see Formula 1) is directly proportional to the gate capacitance that is given by:

$$CG = COX \cdot W \cdot L \quad (3)$$

This means that by aiming to reduce the ON-resistance, the power consumption will increase and vice versa.

This leads to switching power converters classically exhibiting an efficiency peak for a given optimal current load. This efficiency peak is defined by the capacitive losses (i.e. by power consumption POWC) and resistive losses (i.e. RDSON) being minimal. However, when the load current is smaller or bigger than the optimal load, total losses increase and the efficiency falls rapidly. Consequently, there is only a small load current window available to the user, in which the efficiency has not fallen too much and the converter works with acceptable efficiency performance.

SUMMARY OF THE INVENTION

It is a general object of the invention to provide an electronic device for a switched DC-DC conversion and a method for operating the same that are improved with respect to conversion efficiency when working at different current loads.

Accordingly, an electronic device for switched DC-DC conversion of an input voltage level into an output voltage level is provided. The input voltage level may relate to an input power supply or primary power supply (e.g. from a battery or other power source). The output voltage level is also referred to as a secondary power supply and may be used to supply a load with an output voltage, output current and load current, respectively. The electronic device further comprises a first power switch and a second power switch. The first and the second power switch are connected in parallel. The first power switch and the second power switch have a different gate width. The electronic device further comprises a driving stage that is configured to selectively drive the first power switch and/or the second power switch depending on a load current output.

For a given output load current, there is an optimum gate width also referred to as a switch channel width. Efficiency of DC-DC conversion is optimized for this specific output load current by minimizing the sum of capacitive and resistive losses. DC-DC converters according to the prior art have a fixed gate width and accordingly their efficiency is optimized for a certain load current output only. The electronic device according to the invention comprises more than one, i.e. preferably two power switches having a different gate width. Accordingly, there are at least two different load currents for which the electronic device works with maximum efficiency. As a result, the electric device for switched DC-DC conversion according to the invention is more flexible compared to DC-DC converter according to the prior art. Further, the first and second power switch is connected in parallel. If of both power switches work synchronously, this leads to a third efficiency peak. This is due to the fact that the gate width of the two power switches that are connected in parallel may be added. A virtual third power switch comes into existence, wherein the sum of the gate width of the first and second power switch constitutes the gate width of this virtual third power switch.

In a further aspect of the invention, the electronic device comprises a first power switch having a smaller gate width than the second power switch. The driving stage may be further configured to select a first or a second mode of operation. In the first mode of operation, the first power switch is selectively driven while the second power switch is switched off. In the second mode of operation, the first and second power switch are driven synchronously. Accordingly, the electronic device has a first efficiency peak at a low load current and when operating in the first mode. A comparably higher load current is associated to a second efficiency peak that is defined by the second mode of operation.

Further, the driving stage may be configured to select the first mode of operation if the load current output is equal to or lower than a first peak efficiency level of the first power switch. Further, the driving stage may be configured to select the second mode of operation, if the load current output is equal to or above a second peak efficiency level of the first and second power switch operating synchronously. If the load current is equal to the first or second peak efficiency level, the electronic device is operating at maximum efficiency. Furthermore, when the load current is greater than the second peak efficiency level, the rate at which the efficiency falls due to resistive losses, that are dominant at high output currents, is not too high. A similar argument applies to low load currents. Capacitive losses for load currents being lower than the first peak efficiency level will not be too high, since the second power switch having a big gate width that leads to great capacitive losses is switched off.

According to another aspect of the invention, the driving stage is configured to select a third mode of operation, if the load current output lies between the first and second peak efficiency level. The driving stage may be further configured to switch between the first and second mode of operation within a predetermined time interval, when operating in the third mode of operation. The time interval is defined by a gating signal having a frequency that is preferably much lower than the control frequency of the DC-DC converter. By introducing this third mode of operation, the flexibility of the electronic device is further improved.

In another aspect of the invention, the driving stage is configured to switch between the first and second mode of operation so as to set a duty cycle of the third mode of operation to a value that is depending on the value of the load current output. Said load current output is located in an interval that is defined by the first and second peak efficiency level. Further, a ratio of the duty cycle may be proportional to the value of the load current output in the interval between the first and second peak efficiency level. In other words, if the load current is near to a current value at which the first and smaller power switch works at an optimal efficiency, the duty cycle of the switching process between the first and second mode of operation will be very low. At a current value at which the first power switch works with an optimal efficiency, the duty cycle will be equal to zero. On the other hand, when the load current approaches a value at which the first and second power switch working in phase (i.e. synchronously) have an optimal efficiency, the duty cycle of the switching process between the first and second mode of operation will be very high. At a load current at which the first and second power switch that are working synchronously have an optimal efficiency, the duty cycle of the switching process will be equal to one. Inside the interval between the first and second efficiency peaks, the duty cycle is varied preferably linearly. Due to this measure, the overall efficiency of the DC-DC conversion may be optimized within the whole interval. The optimal conversion efficiency is achieved for load current values that are situated between the first and second peak efficiency levels.

The invention also provides a method for operating an electronic device for a switched DC-DC conversion of an input voltage level into an output voltage level, wherein the electronic device comprises a first and a second power switch. The first and second power switch is connected in parallel. The switches have a different gate width. The method comprises the step of selectively driving the first and/or second power switch depending on the load current output.

Further aspects of the invention will appear from the appending claims and from the following detailed description given with reference to the appending drawings.

DETAILED DESCRIPTION OF AN EXAMPLE EMBODIMENT

Figure 1:
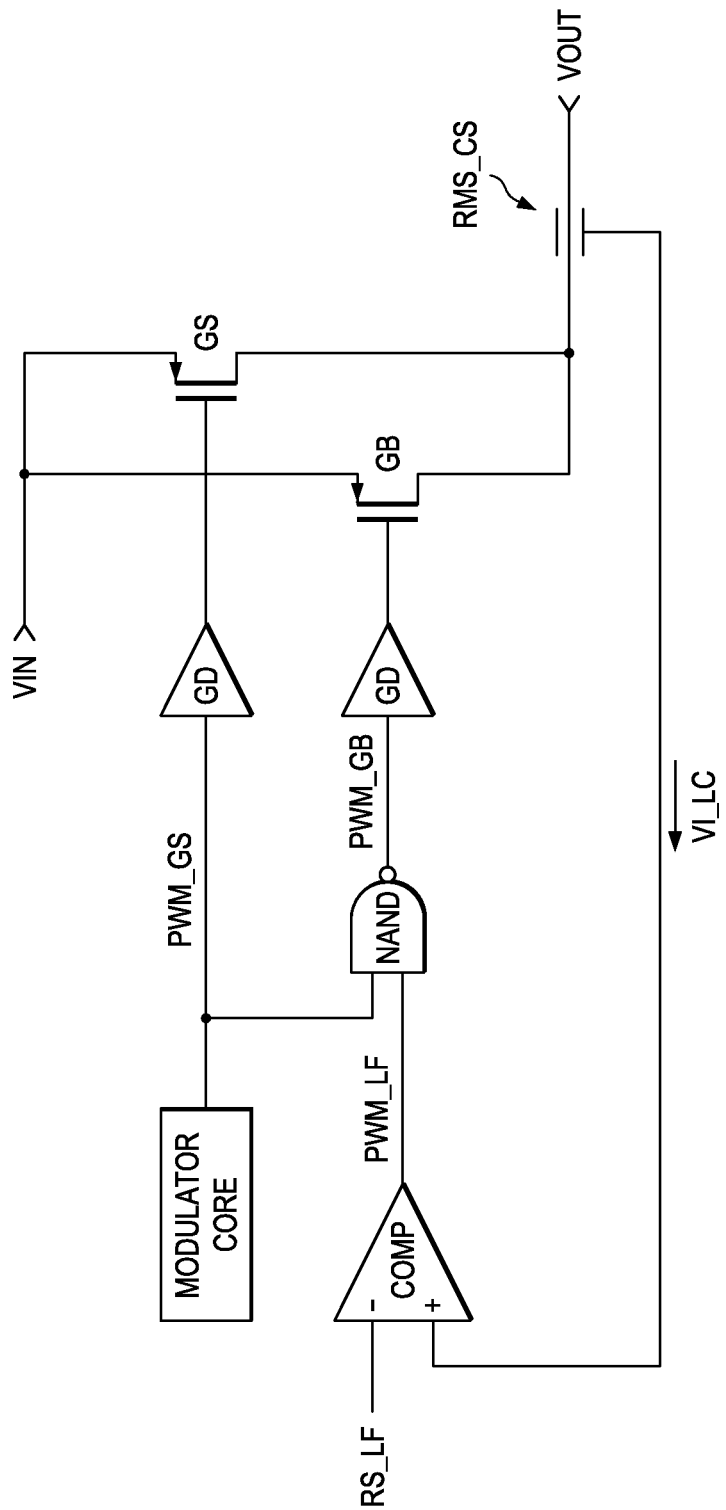
FIG. 1 shows a simplified circuit diagram of an electronic device for a switched DC-DC conversion of an embodiment according to the invention.

FIG. 1 is a simplified circuit diagram of an electronic device for a switched DC-DC conversion according to an embodiment of the invention. Only the most important components of a DC-DC converter are depicted. Omitted components that might be necessary for practical operation of the DC-DC converter are known to a skilled person from the prior art.

There is a first and a second power switch also referred to as a small gate GS (having a smaller gate width than GB) and a big gate GB (having a greater gate width than GS). The power switches may be implemented as PMOS or NMOS transistors and are further preferably field effect transistors (MOSFETs). Each power switch GS, GB is connected to a suitable gate driver GD. A first or high side of the switch GB, GS is connected to an input voltage VIN while a second or low side delivers an output voltage VOUT. The small gate GS and the big gate GB are connected in parallel.

Figure 2:
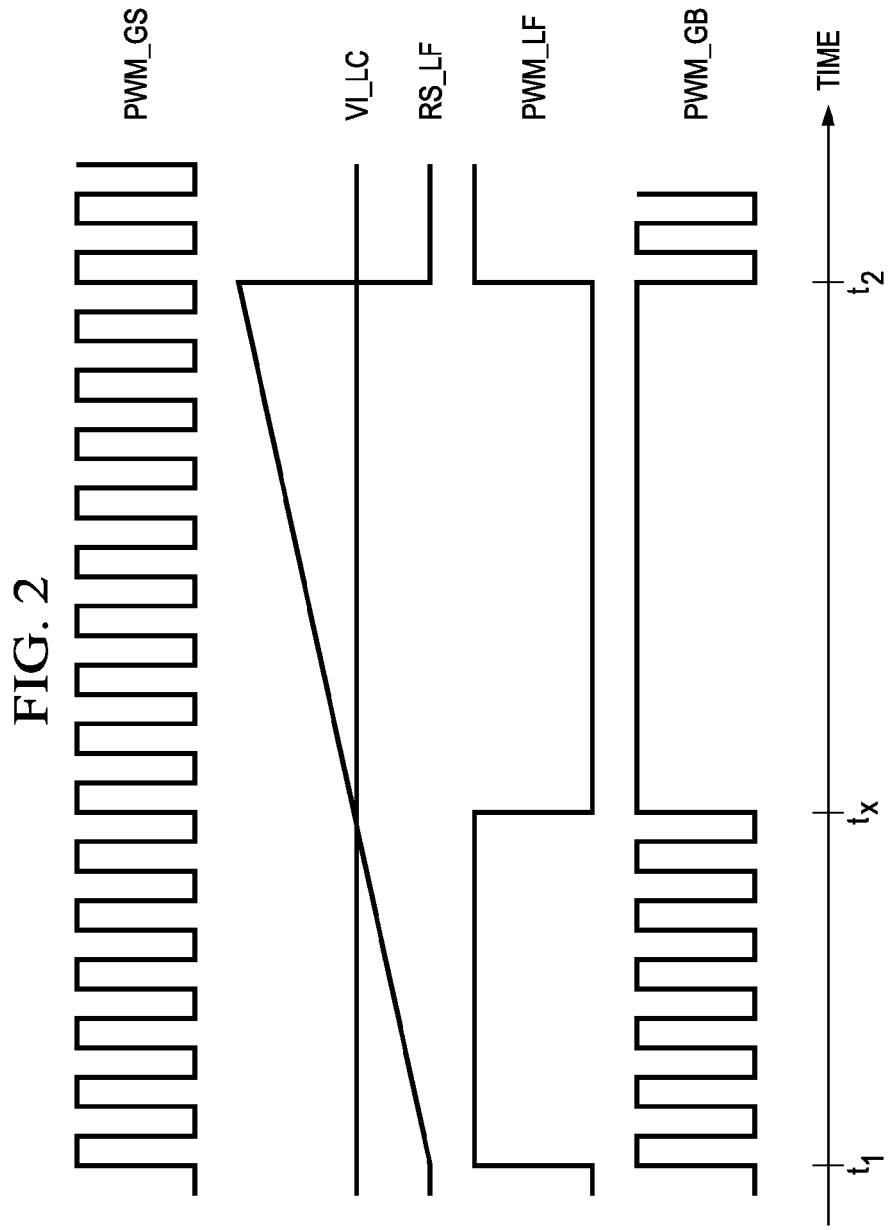
FIG. 2 shows schematic graphs of time dependent signals that are driving a DC-DC converter according to an aspect of the invention.

The power switches GS, GB are preferably operated in a pulse width modulation mode. The gate driver GD of the small gate GS receives a signal PWM_GS from the modulator core. Exemplarily, this time dependent signal is depicted in FIG. 2 and is also named PWM_GS. When operating the DC-DC converter according to an exemple embodiment at a load current that is smaller than or equal to the peak efficiency level of the small gate GS, the big gate GB is completely switched off. This is also referred to as a first mode of operation. On the other hand, when the DC-DC converter is operating at a load current that is greater than a sum-peak efficiency level that is defined by the sum of the peak efficiency level of the small gate GS plus the peak efficiency level of the big gate GB, both, the big gate GB and the small gate GS are working synchronously, i.e. in phase. Accordingly, both, the gate driver GD of the small and the big gate GS, GB are fed with the same pulse width modulated signal PWM_GS. This mode is referred to as a second mode of operation.

Between the two aforementioned peak efficiency levels, the DC-DC converter is operating in a third mode of operation. Details will be explained by making reference to the simplified circuit diagram in FIG. 1 as well as by making reference to the signals in FIG. 2.

A pulse of modulated signal PWM_GS is generated by the modulator core and is fed to the gate driver GD of the small gate GS as well as to a NAND logic. A saw tooth gating signal RS_LF having preferably a much lower frequency than the pulse with modulated signal PWM_GS is fed to a comparator Comp. Signal PWM_GS is compared by the comparator Comp to a voltage image of the load current VI_LS. The latter is sensed by a suitable current sensor RMS_CS at the output VOUT. The current sensor RMS_CS is preferably sensing a root mean square of the load current VOUT. As long as the signal RS_LF is smaller than the voltage image of the load current VI_LC (see the time span between t1 and tx in FIG. 2), the signal PWM_LF that is fed to the NAND logic remains high. Since the NAND logic combines the signal PWM_LF and the pulse with modulated drive signal PWM_GS, its output signal PWM_GB follows the signal PWM_GS within the time span between t1 and tx. The signal PWM_GB is fed to the gate driver GD of the big gate BG. When the low frequency ramp voltage RS_LF crosses the voltage image of the load current VI_LC (that is the case at time tx), the comparator Comp sets the signal PWM_LF to low. Consequently, the NAND logic switches off the gate driver GD of the big gate GB. Accordingly, as shown in FIG. 2, the pulse width modulated signal PWM_GB remains high between tx and t2. When the ramp voltage RS_LF is reset, and a new time interval/gate starts, and the same procedure starts again. The duty cycle of the DC-DC conversion is defined by the ratio of the time intervals tx minus t1 divided by t2 minus tx. Obviously, the value of the duty cycle depends on the level of the voltage image of the load current VI_LC with respect to the low frequency ramp signal RS_LF. When the level of the load current image VI_LC increases, tx will shift to longer times and consequently the duty cycle will increase. The opposite effect is taking place when the voltage image of the load current VI_LC decreases. The point in time tx will shift towards shorter times and the duty cycle becomes lower.

When the load current approaches a value at which the smaller power switch GS works at a maximum efficiency, the value of the duty cycle approaches zero. On the other hand, when the load current approaches a value at which the small gate GS and the big gate GB working synchronously have a maximum efficiency, the value of the duty cycle approaches one. When the load current is between these two maximum efficiency peaks, the duty cycle varies linearly with the load current.

Figure 3:
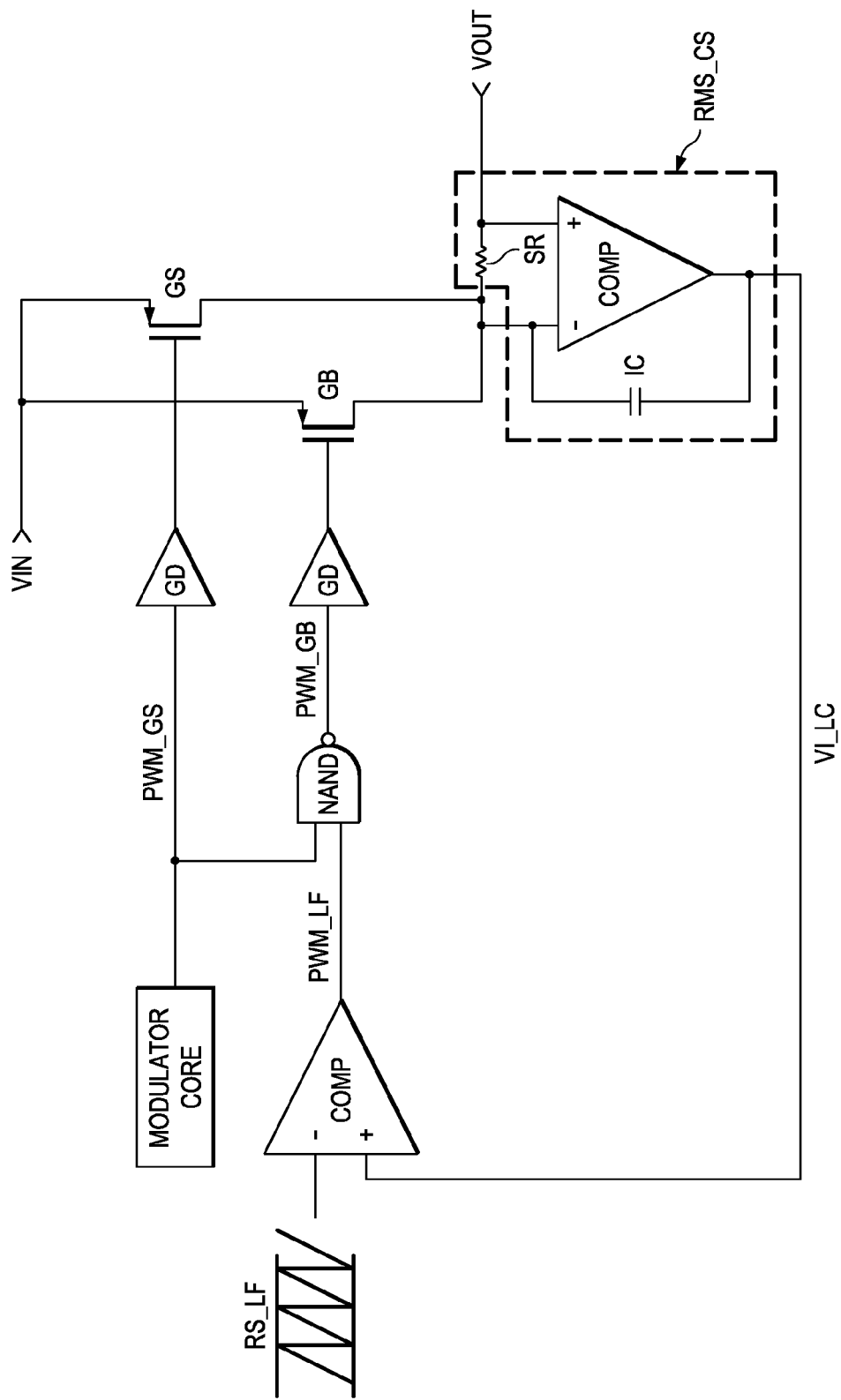
FIG. 3 shows a further simplified circuit diagram of an embodiment of the invention.

FIG. 3 shows a further embodiment of the invention. In comparison to the embodiment known from FIG. 1, this embodiment shows a different RMS current sensor RMS_CS. The RMS value of the load current VOUT is sensed by a sensing resistor SR and a comparator having an integrating capacitor IC.

In the following, a brief mathematical analysis of the efficiency of the electronic device for DC-DC conversion will be given. It will be illustrated that the efficiency of the DC-DC conversion is optimized at least for load currents within the two peaks of maximum efficiency that are defined by the gate length of the small gate GS and the big gate GB.

By way of an example, it shall be assumed that WOPT is the optimum switch channel width at which the efficiency is optimized by minimizing the sum of capacitive and resistive losses. WOPT is proportional to the load current, wherein the proportional factor is a solely design related value that is independent of the load current.

According to an aspect of the invention, the electronic device for DC-DC conversion comprises a first and second power switch. The first power switch GB has a large gate width Wbig and the small power switch GS has a small gate width Wsmall. Accordingly, there is an optimal load current Ismall that is defined by the small gate width Wsmall. When the big and small power switch GB, GS are operating synchronously, there is a maximum efficiency at load current Ibig. It shall be further assumed that the duty cycle for switching between the first and the second mode of operation is D. In other words, D is the duty cycle of the electronic device when operating in the third mode of operation. As mentioned before, D is equal to zero if the load current is smaller than or equal to Ismall and D will be equal to one if the load current load is equal to or bigger than Ibig. When the load current Iload is between Ismall and Ibig, D is given by the following equation:

$$D = \frac{|Iload| - |Ismall|}{|Ibig| - |Ismall|} \text{ when } |Ismall| \leq |Iload| \leq |Ibig| \quad (4)$$

Obviously, the duty cycle D is proportional to the load current Iload.

When the electronic device is operating in the third mode of operation, the width W of the two power switches working synchronously can be expressed as follows when averaged in time:

$$W = Wsmall + D*Wbig \quad (5)$$

Wherein Wsmall is the width of the small gate SG, Wbig is the gate width of the big gate BG and D is the duty cycle as defined by formula (4). As already known, the optimal width at the peak efficiency level for the small gate is Wsmall at a load current Ismall. Accordingly Wsmall is defined by the following equation:

$$Wsmall = \alpha |Ismall| \quad (6)$$

When the DC-DC converter is operating in the second mode of operation, the sum of the gate width of the small gate and the big gate defines the optimal load current Ibig according to the following equation:

$$Wsmall + Wbig = \alpha |Ibig| \quad (7)$$

Where $\alpha$ is a proportionality constant.

As can be seen from equation 5, when inserting the values of Wsmall and Wbig, we obtain an optimal efficiency due to the fact that the gate width W may be varied by the value of the duty cycle D for all currents between Ismall and Ibig:

$$W = \alpha |Ismall| + D(\alpha |Ibig| - \alpha |Ismall|) \quad (8)$$

Accordingly, a virtual width of the gate and therefore the efficiency are optimal within a complete load current window ranging from Ismall to Ibig.

Although the invention has been described in detail, it should be understood that various changes, substitutions and alterations can be made thereto without departing from the spirit and scope of the invention as defined by the appended claims.

The invention claimed is:

1. An electronic device for switched DC-DC conversion of input voltage level into an output voltage level comprising:
    a first power switch couplable to a load receiving a pulse width modulated (PWM) signal to generate the output voltage;
    a second power switch coupled in parallel with the first power switch having a gate width larger than the first power switch and being couplable to the load, the second power switch receiving a drive signal that compares a timing signal having a switching frequency lower than that of the PWM signal with a signal level related to output current, wherein the first power switch is continually driven by the PWM signal and the second power switch is driven by a portion of the PWM signal.

2. The electronic device of claim 1 wherein the portion of the PWM signal utilized to drive the second power switch varies between approaching 0% approaching 100%.

3. The electronic device of claim 2 wherein the portion of the PWM signal utilized to drive the second transistor is defined by the ratio of the time intervals (tx minus $t_1$)/($t_2$ minus tx), where:
    $t_1$=a starting point for the low-frequency signal;
    $t_2$=an ending point for the low-frequency signal;
    tx=a point between t1 and t2 where the low-frequency signal exceeds a value related to output current.

4. The electronic device of claim 2 wherein the low frequency signal is a sawtooth signal.

5. The electronic device of claim 1 wherein when the portion of the PWM signal approaches 100%, the first and second power switches operate synchronously.

6. The electronic device of claim 5 is a wherein the low frequency signal is a sawtooth signal.

7. The electronic device of claim 1 wherein the low frequency signal is a sawtooth signal.

8. A method for operating an electronic device for switched DC-DC conversion of input voltage level into an output voltage level comprising:
   coupling a first power switch to a load receiving a pulse width modulated (PWM) signal to generate the output voltage;
   coupling a second power switch coupled in parallel with the first power switch having a gate width larger than the first power switch and being coupled to the load;
   receiving a drive signal at the second power switch that compares a timing signal having a switching frequency lower than that of the PWM signal with a signal level related to output current, wherein the first power switch is continually driven by the PWM signal and the second power switch is driven by a portion of the PWM signal.

9. The method of claim 8 wherein the portion of the PWM signal utilized to drive the second power switch varies between approaching 0% approaching 100%.

10. The method of claim 9 wherein the low frequency signal is a sawtooth signal.

11. The method of claim 9 wherein when the portion of the PWM signal approaches 100%, the first and second power switches operate synchronously.

12. The method of claim 11 is a wherein the low frequency signal is a sawtooth signal.

13. The method of claim 8 wherein the portion of the PWM signal utilized to drive the second transistor is defined by the ratio of the time intervals (tx minus $t_1$)/($t_2$ minus tx), where:
   $t_1$=a starting point for the low-frequency signal;
   $t_2$=an ending point for the low-frequency signal;
   tx=a point between t1 and t2 where the low-frequency signal exceeds a value related to output current.

14. The method of claim 8 wherein the low frequency signal is a sawtooth signal.

* * * * *